(12) United States Patent
Richins

(10) Patent No.: US 7,832,113 B1
(45) Date of Patent: *Nov. 16, 2010

(54) COLLAPSIBLE LEVEL AND UTILITY DEVICE

(75) Inventor: Russell D. Richins, Orem, UT (US)

(73) Assignee: Light Path, LLC, Orem, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/427,515

(22) Filed: Apr. 21, 2009

Related U.S. Application Data

(63) Continuation of application No. 11/899,156, filed on Aug. 31, 2007, now Pat. No. 7,520,066.

(51) Int. Cl.
*G01C 9/18* (2006.01)
*G01C 9/00* (2006.01)

(52) U.S. Cl. .......................................... 33/374; 33/478

(58) Field of Classification Search ................... 33/374, 33/365, 478
See application file for complete search history.

(56) References Cited

U.S. PATENT DOCUMENTS

| | | | |
|---|---|---|---|
| 732,827 A | 7/1903 | Chambers | |
| 1,014,402 A | 1/1912 | Larsen | |
| 1,361,367 A * | 12/1920 | Coxey | 33/351 |
| 2,559,961 A | 7/1951 | Howell | |
| 2,748,494 A | 6/1956 | Raney | |
| 2,878,569 A | 3/1959 | Metrulis | |
| 3,762,058 A * | 10/1973 | Heater | 33/809 |
| 4,194,295 A | 3/1980 | Simuro et al. | |
| 4,317,289 A | 3/1982 | Conn | |
| 4,332,046 A | 6/1982 | Foley et al. | |
| 4,435,908 A | 3/1984 | Semler, Jr. | |
| 4,524,527 A | 6/1985 | Jeffrey | |
| 4,862,595 A | 9/1989 | Drumright | |
| 4,928,395 A | 5/1990 | Good | |
| 5,155,917 A | 10/1992 | Townsend et al. | |
| 5,157,842 A * | 10/1992 | Swanda | 33/365 |
| 5,412,875 A | 5/1995 | Hilderbrandt | |
| 5,421,094 A * | 6/1995 | McCord et al. | 33/373 |
| 5,433,011 A | 7/1995 | Scarborough et al. | |
| 5,524,353 A | 6/1996 | Fink | |
| 5,568,265 A * | 10/1996 | Matthews | 356/399 |

(Continued)

*Primary Examiner*—Christopher W Fulton
(74) *Attorney, Agent, or Firm*—Thorpe North & Western LLP

(57) ABSTRACT

The present invention resides in a collapsible level comprising a first segment; at least one additional segment, physically independent of the first segment and operable with the first segment to form the level; a leveling vial supported in at least one of the segments; and a linking member operable with the segments to permit the segments to be assembled and to secure an assembled relationship between the segments, as well as to maintain a connection between the segments when disassembled. In an alternative embodiment, the linking member is removed and the segments link together magnetically. The present invention further provides means for longitudinally extending the length of the collapsible level, thereby providing the collapsible level with the ability to level a wide range of shaped and sized surfaces. The present invention further resides in an accessory device operable with a level to enhance the functionality of the level, the accessory device comprising: a housing; and means for attaching the housing to the level in both a removable and slidable manner.

22 Claims, 11 Drawing Sheets

U.S. PATENT DOCUMENTS

| | | |
|---|---|---|
| 5,577,327 A | 11/1996 | Archambault |
| 5,617,641 A | 4/1997 | Aarhus |
| 5,784,792 A * | 7/1998 | Smith .................... 33/227 |
| 5,832,618 A | 11/1998 | Scarborough |
| 6,041,510 A | 3/2000 | Huff |
| 6,047,478 A | 4/2000 | Sowers |
| 6,532,675 B2 * | 3/2003 | Letourneau ............. 33/277 |
| 6,560,885 B1 | 5/2003 | Cosentino |
| 6,637,120 B2 | 10/2003 | Pustay |
| 6,658,752 B1 | 12/2003 | Bonaventura, Jr. |
| 6,694,632 B1 | 2/2004 | Schooley |
| 6,732,441 B2 | 5/2004 | Charay et al. |
| 6,796,045 B2 | 9/2004 | Hallee |
| 6,836,973 B1 | 1/2005 | Eccles, Jr. |
| 6,839,974 B1 | 1/2005 | Hitchcock |
| 6,915,585 B2 | 7/2005 | Von Wedemeyer |
| 6,966,119 B1 | 11/2005 | Dlugoleski |
| 7,281,335 B2 | 10/2007 | Feliciano |
| 7,520,066 B2 | 4/2009 | Richins |
| 2002/0121025 A1 | 9/2002 | Leite |
| 2002/0170190 A1 * | 11/2002 | Wetterlind ............... 33/286 |
| 2007/0079516 A1 | 4/2007 | Eckstein et al. |
| 2007/0266576 A1 | 11/2007 | Vaes |

* cited by examiner

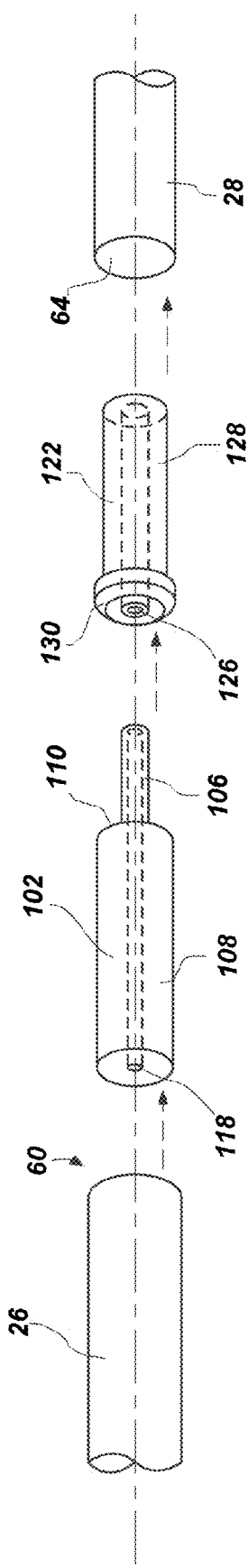
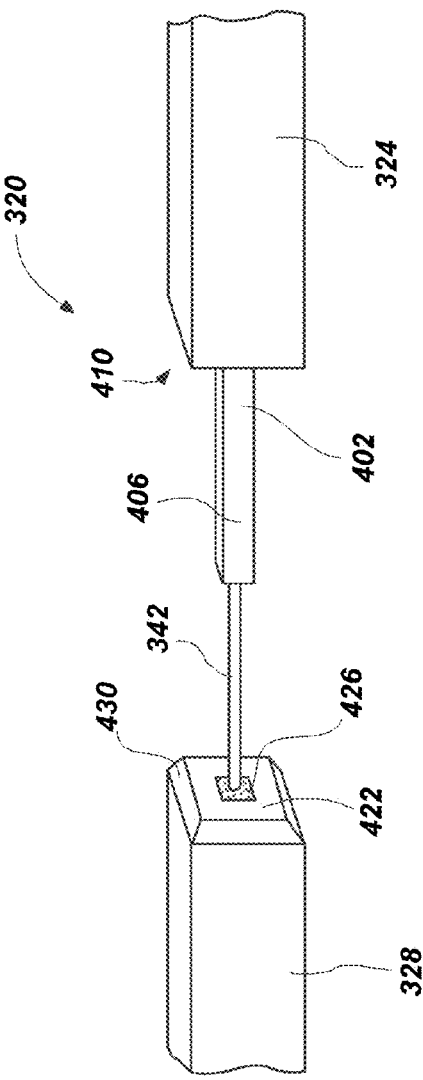
FIG. 4
FIG. 5

COLLAPSIBLE LEVEL AND UTILITY DEVICE

RELATED APPLICATIONS

This application is a continuation of U.S. application Ser. No. 11/899,156, filed Aug. 31, 2007, and entitled "Collapsible Level and Utility Device," and which application is incorporated by reference in its entirety herein.

FIELD OF THE INVENTION

The present invention relates generally to devices for leveling a surface and particularly to leveling devices comprising multiple segments.

BACKGROUND OF THE INVENTION AND RELATED ART

Levels, as common utility devices, are used to ascertain the orientation of a surface (e.g., horizontal or vertical). Levels are generally fitted with a vial that is oriented, as precisely as possible, with respect to a leveling surface of the level and that functions to provide a user with feedback about the orientation of the level, and more importantly, about the surface adjacent or in contact with the level. A common vial used is a spirit vial, which provides visual feedback about the orientation of a surface. Spirit vials are generally cylindrical in shape and are partially filled with liquid leaving enough air in the cylinder to form a bubble. Spirit vials are also constructed out of a clear material such as glass or a clear plastic to provide visual feedback. Water may be used as the liquid in a vial, however, many vials employ other liquids that have a lower freezing temperature to increase the range of conditions that the level may be used in. A vial is usually calibrated by placing the vial in a substantially horizontal position so that the buoyant force of the bubble of trapped air forces the bubble to locate in the center of the cylinder. Reference marks are then usually placed on the surface of the vial at both ends of the bubble so that the bubble is between the reference marks when the vial is in a horizontal position. The vial is then precisely oriented with respect to the leveling device so that when the leveling surface of the leveling device is located in a particular orientation, the bubble of trapped air is forced to occupy the position between the reference marks visually indicating to the user that the leveling surface is located in that position. Leveling vials are commonly oriented horizontally or vertically in a leveling device and used to measure surfaces having horizontal or vertical orientations. However, a leveling vial may be oriented at any angle with respect to a leveling device as desired by a user. Some levels also include adjustable leveling vials that may be set at a plurality of leveling positions to level multiple surface orientations. Other leveling devices include a laser emitting apparatus that emits a laser beam indicating a position away from the level that is directly in line with the orientation of the level.

Many conventional levels comprise a solid, single structure with one or more leveling vials supported therein. These typically comprise a square or rectangular cross-section providing at least one planar leveling surface (as viewed in cross-section). Such levels are also typically between 1 and 4 feet in length. While practical in application, these types of levels have some significant drawbacks. For example, they are difficult to port or carry around when not in use. Because of their high aspect ratio (i.e., ratio of length to width measurement) it is difficult for users to carry or store them on their person when not in use, or when merely contemplating their use. This awkward configuration makes them prone to breakage. In addition, this configuration introduces limitations in that the planar leveling surface must be used properly (e.g., the entire surface flush with the surface being leveled), thus sometimes making it difficult to use the level in all applications.

SUMMARY OF THE INVENTION

In accordance with the invention as embodied and broadly described herein, the present invention resides in a collapsible level comprising a first segment; at least one additional segment, physically independent of the first segment and operable with the first segment to form the level; a leveling vial supported in at least one of the segments; and a linking member operable with the segments to permit the segments to be assembled and to secure an assembled relationship between the segments, as well as to maintain a connection between the segments when disassembled.

The present invention further resides in an accessory device operable with a level to enhance the functionality of the level, the accessory device comprising: a housing; and means for attaching the housing to the level in both a removable and slidable manner.

The present invention still further resides in a method for operating a collapsible level, the method comprising: obtaining a first segment; obtaining at least one additional segment, physically independent of the first segment and operable with the first segment to form the level, wherein one of the segments comprises a leveling vial; and linking the segments to permit the segments to be assembled and to secure an assembled relationship between the segments, as well as to maintain a connection between the segments when disassembled.

The present invention resides even further in a method for facilitating the assisted assembly of the individual segments of a collapsible level, the method comprising: linking at least two segments of the collapsible level together with an elastic member that functions to maintain a connection between the segments when disassembled, and that assists in the assembly of the segments by drawing the segments together into a properly aligned and assembled connection configuration.

The present invention resides further still in a collapsible level comprising: at least two segments, physically independent of each other, wherein at least one of the segments contains a leveling vial; and means for magnetically coupling the segments, wherein the means facilitates in the assembly of the segments to form the level, and wherein the means secures an assembled relationship between the segments.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 4 illustrates an exploded, partial perspective view of two segments of an exemplary collapsible level configured to couple to one another via corresponding male and female inserts;

FIG. 5 illustrates a partial perspective view of another exemplary embodiment of the collapsible level and utility device of the present invention;

FIG. 11-B illustrates a front view of another exemplary accessory device, wherein the accessory device comprises various reference indicia on a surface of the accessory device;

FIG. 11-C illustrates a side view of another exemplary accessory device having a knob operable therewith;

FIG. 16-B illustrates a cross-sectional view of a universal insert formed in accordance with one exemplary embodiment of the present invention, wherein the universal insert comprises both male and female portions;

FIG. 17-B illustrates a perspective view of the collapsible level of FIG. 17-A being assembled by a user simply by manipulating the segments of the collapsible level to allow an elastic tethering or linking member to draw and couple the various segments together.

DETAILED DESCRIPTION OF EXEMPLARY EMBODIMENTS

Figure 1:
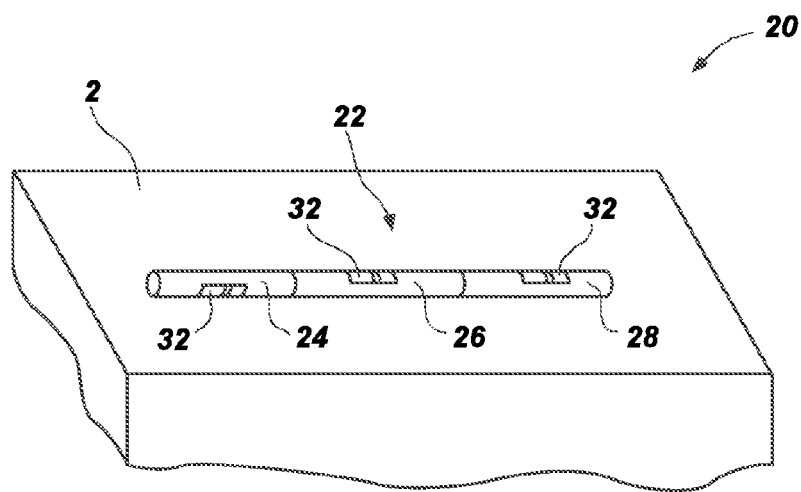
FIG. 1 illustrates a perspective view of an exemplary collapsible level and utility device of the present invention shown in an assembled state and located on a horizontal surface.

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a collapsible level and utility device (hereinafter "collapsible level" or "collapsible leveling device") comprising a first segment; at least one additional segment, physically independent of the first segment and operable with the first segment to form the level; a leveling vial supported in at least one of the segments; and a tethering or linking member operable with the segments to permit the segments to be assembled and to secure an assembled relationship between the segments, as well as to maintain a connection between the segments when disassembled.

The present invention collapsible level and utility device provides several significant advantages over prior related leveling devices, some of which are recited here and throughout the following more detailed description. First, the collapsible leveling device permits a level to be disassembled into several separate segments while maintaining a connection between the segments, via the tethering or linking member, thereby providing the level with the advantage of reduced storage space while eliminating the risk of losing any one segment. Second, the collapsible leveling device permits the separate segments to be easily assembled by providing a tethering or linking member that couples the segments and that may, as optionally configured, function to bias the segments to form an assembled configuration. The collapsible leveling device further permits the easy assembly of the segments by providing a pair of inserts that facilitate the coupling and proper alignment of the segments. Third, the collapsible level may be configured to provide an infinite number of leveling surfaces by providing a cross-section having one or more curves. Fourth, the collapsible leveling device provides means for longitudinally extending the length of the collapsible level, thus providing the collapsible level with the ability to level a wide range of shaped and sized surfaces.

Each of the above-recited advantages will be apparent in light of the detailed description set forth below, with reference to the accompanying drawings. These advantages are not meant to be limiting in any way. Indeed, one skilled in the art will appreciate that other advantages may be realized, other than those specifically recited herein, upon practicing the present invention.

With reference to FIG. 1, illustrated is a collapsible leveling device 20 operable to level or plumb a surface. The collapsible leveling device 20 comprises a plurality of individual and removably connectable segments 22, at least one of the segments being configured to support a leveling vial 32 visible through a window formed in the segments 22 (with separate vials 32 being shown as supported within each of segments 24, 26 and 28). The collapsible leveling device 20 is shown positioned about an object 2 having a substantially horizontal orientation.

The individual segments 22 are configured to assemble coaxially with one another to form the collapsible level 20. According to the present embodiment shown, the leveling device 20 comprises a central segment 26, a first end segment 24, and a second end segment 28. However, the collapsible level could easily be configured to include more or less segments as desired and, therefore, is not meant to be limited in any way by the description of the present embodiment as shown in FIG. 1. The collapsible level 20 is designed and configured so that the separate segments 22 are coaxially aligned to form a substantially even leveling surface (not clearly shown). The collapsible level 20 is further designed and configured so that the leveling vials 32 are visible about different leveling surfaces on the collapsible level 20.

The collapsible level 20, according to the present exemplary embodiment, comprises a circular cross-section. However, as will be described below, the collapsible level may be configured with other cross-sectional geometries, such as square or rectangular. Nonetheless, the circular cross-section of the collapsible level 20 functions to provide the collapsible level 20 with an infinite number of leveling surfaces. Indeed, rolling or rotationally orienting the collapsible level at different angular orientations provides the collapsible level with a different leveling surface. An advantage of such a design is that the leveling device does not need to be oriented about any one particular planar leveling surface in order to provide leveling feedback about a surface. Rather, a user need only place the collapsible leveling device 20 on a surface, rotationally position or orient (or reorient) the collapsible leveling device 20 as needed, and monitor the feedback. An additional advantage of such a design is that the leveling vial 32 is visible about multiple leveling surfaces due to the window preferably following the contour of the segment supporting the vial. As the rotational orientation of the collapsible level 20 is changed (e.g., as different leveling surfaces are selected), the leveling vials continue to be visible through several degrees of rotation. The collapsible level 20 may also be configured so that a leveling vial is visible as the collapsible level is rotated 360 degrees about a longitudinal central axis. For example, the series of leveling vials 32 may be staggered in relation to each other so that as the collapsible level is rotated and the visibility of one leveling vial progressively decreases, the visibility of a staggered leveling vial progressively increases. Such a design would allow the collapsible level to quickly determine the levelness of a surface, such as the surface of the object 2 shown in FIG. 1, simply by rolling the collapsible level across the surface and monitoring the several vials.

Figure 2:
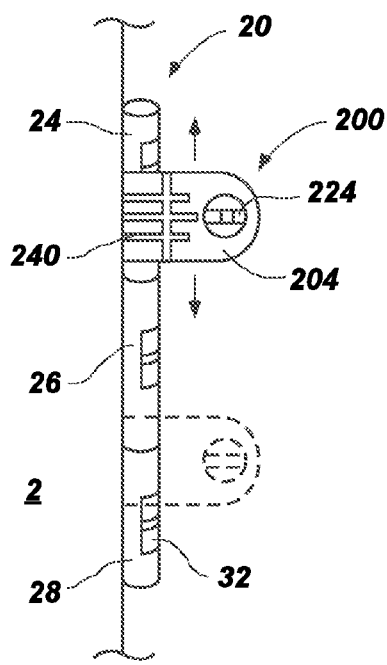
FIG. 2 illustrates a side view of another exemplary collapsible level and utility device of the present invention shown in an assembled state and located about a vertical surface.

Referring now to FIG. 2, illustrated is the collapsible level 20 of FIG. 1 comprising the central segment 26, the first end segment 24, the second end segment 28, and the series of leveling vials 32 used in combination with an accessory device 200 having a housing 204 that is removably attachable to the collapsible level 20 and capable of slidingly adjusting along the length of the collapsible level. The figure shows the accessory device 200 occupying two positions, where the second position of the accessory device 200 is shown in phantom view. The accessory device 200 functions to increase the functionality and capabilities of the collapsible level 20. Specifically, the accessory device 200 increases the functionality of the collapsible level 20 by facilitating other leveling functions. For example, the accessory device 200 may be configured to include a leveling vial 224 within the housing 204, where the orientation of the leveling vial 224 of the accessory device 200 is offset from the leveling vial 32 supported within one of the segments of the collapsible level 20. In one embodiment, the leveling vial 224 of the accessory device 200 may be oriented perpendicular the leveling vial 32 of the collapsible level. In another embodiment, the leveling vial of the accessory device can have an angular orientation with respect to the leveling vial of the collapsible level. The accessory device 200 may then be attached to the collapsible level 20 and a surface having an orientation offset from a horizontal plane (e.g. a vertical or angled surface) may be leveled. FIG. 2 shows the accessory device 200 having a leveling vial 224 that is perpendicular to the leveling vial 32 of the collapsible level 20 and further shows the collapsible level and the accessory device functioning to level a surface of an object 2 having a substantially vertical orientation.

Figure 13:
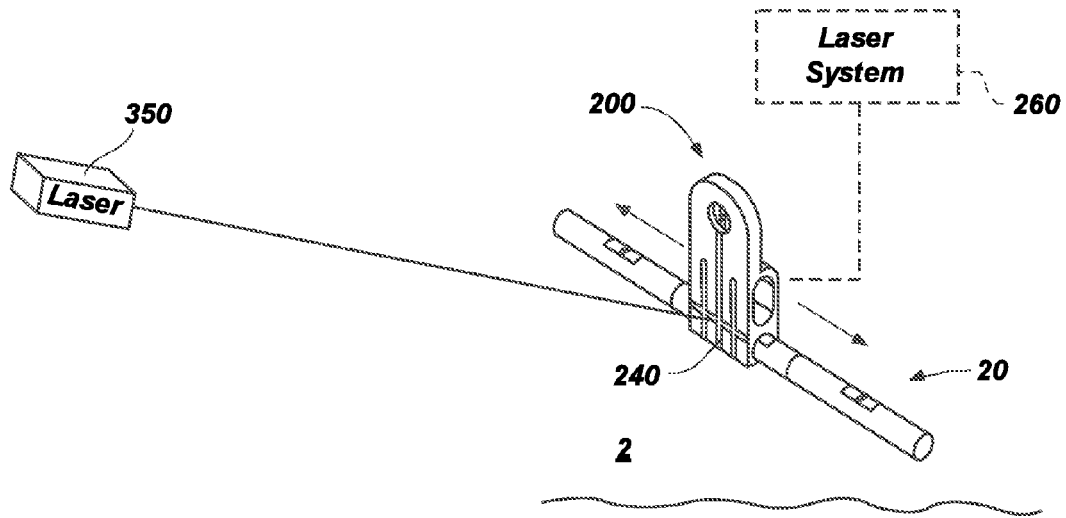
FIG. 13 illustrates a perspective view of an exemplary accessory device operable with a laser leveling device, wherein the accessory device is being used in combination with the laser leveling device to level a surface.

The accessory device 200 may also be configured to include one or more indicia 240 that permit the accessory device to be used with a laser level (not shown, but see FIG. 13). The indicia 240 may be in the form of grooves cut along a surface of the housing 204 that allow the accessory device 200 to operate with a laser level to level a surface. Alternatively, the indicia 240 may be provided on the surface via paint, adhesives, etc. The accessory device and laser level are further described below.

Figure 3:
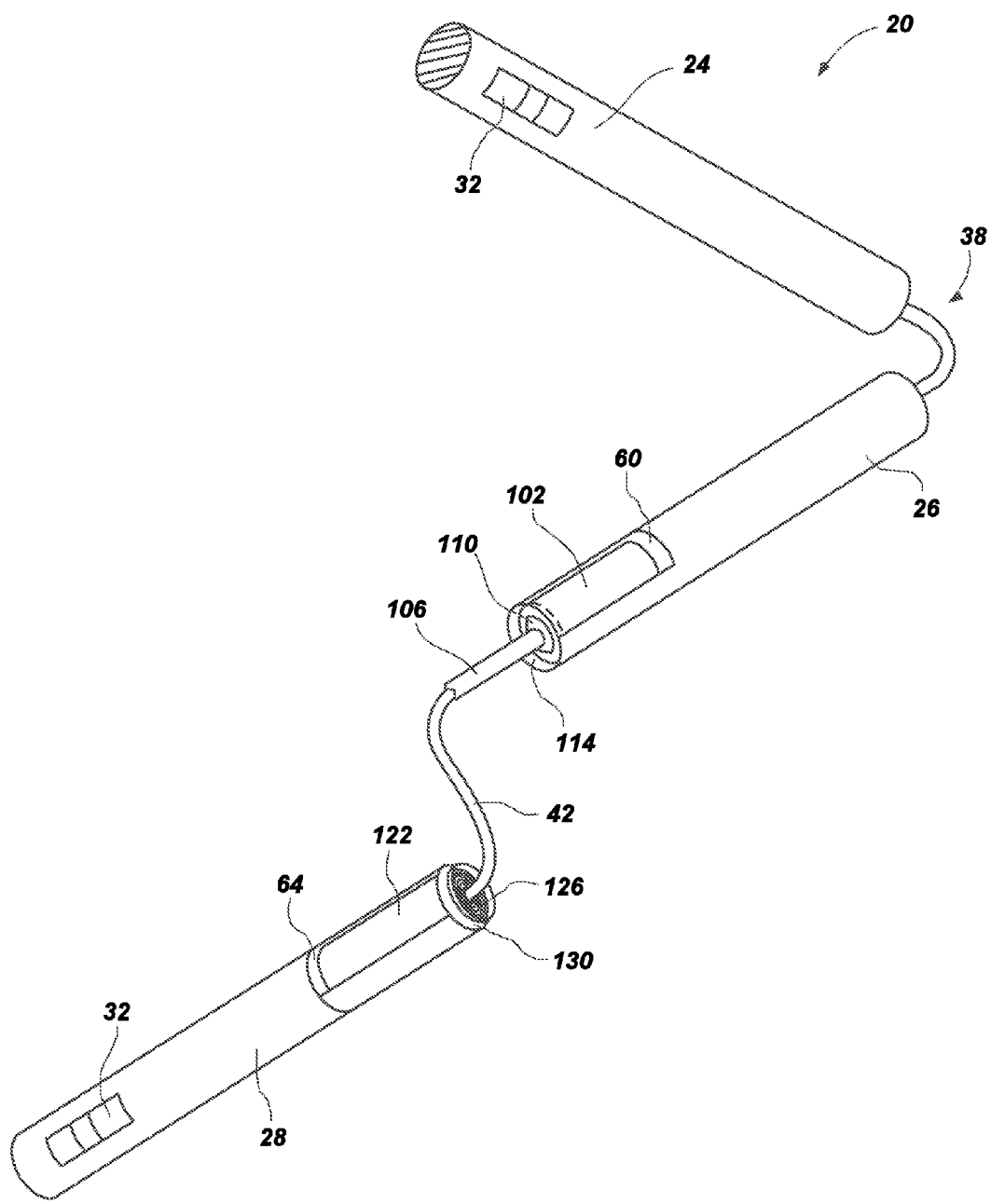
FIG. 3 illustrates a perspective view of a collapsible level and utility device in accordance with one exemplary embodiment of the present invention, shown with its various segments in a disassembled, yet tethered or linked, state.

Referring now to FIG. 3, illustrated is a more detailed drawing of the collapsible level 20, shown in a disassembled state with each of the segments detached from one another, yet held together by a tethering or linking member 38. In addition to maintaining a connection between the segments while disassembled, the tethering or linking member 38 functions to facilitate the assembly of the segments and to secure a properly aligned and assembled relationship between the segments. According to the present embodiment, the linking member is shown in the figure as comprising an elastic shock cord 42, such as a bungee cord. Furthermore, the figure shows the central segment 26 disassembled from the first end segment 24 and the second end segment 28 with a connection maintained between the segments by the elastic shock cord 42. The elastic shock cord 42 can be secured to the separate segments so that the elastic shock cord 42 is stretched from a more relaxed state when the segments are disassembled thereby creating a tension force operating or having a tendency to draw the segments together. Such a design can be advantageously used to bias the collapsible level 20 toward an assembled state. Additionally, the elastic shock cord 42 can be used to secure the segments in the assembled state by attaching the shock cord 42 in a manner so that it is maintained in a stretched state even when the segments are assembled, thereby creating a continual force operating to facilitate holding of the various segments together.

Of course, other types of tethering or linking members are contemplated herein. For example, the tethering or linking member 38 may comprise an inelastic cord, a wire, a rope, a cable, or any other flexible material. Additionally, other methods of drawing the segments together are contemplated herein. For example, one end of a wire, rope, or cable can be coupled with a spring located in the interior of one of the segments and the other end of the wire, rope, or cable can be coupled with an additional segment or an additional spring located in the interior of a different segment. The wire, rope, or cable; the spring or springs; and the segments can be coupled together so that the spring(s) is stretched from a more relaxed state as the segments are disassembled, thereby creating a force functioning to reassemble the segments that is transferred to the segments by the wire, rope, or cable.

Referring now to FIGS. 3 and 4, illustrated is a male insert 102 attachable to or secured within the central segment 26, and a female insert 122 attachable to or secured within the first end segment 28 of the collapsible level 20. The inserts 102 and 122 function to removably secure and facilitate coaxial alignment and coupling of the separate segments about a longitudinally central axis. The inserts 102 and 122 are described according to a preferred embodiment and are designed such that the male and female inserts 102 and 122, respectively, can be operable with any of the central segment 26, the first end segment 24 and the second end segment 28, or any other or additional segments that may be included in the collapsible leveling device.

The inserts 102 and 122 and segments 24, 26 and 28 may be constructed from a material having a cross-section of various geometries, whereby the inserts can be attached to the segments by inserting the appropriate insert within the tubing of a corresponding appropriate segment. More specifically, FIG. 4 illustrates a first end segment 24 and a second end segment 28 being constructed of circular tubing and having inner surfaces 60 and 64 respectively (shown via the respective cutaway portions in FIG. 3). The figure further illustrates a male insert 102 and a female insert 122 constructed to have a circular cross section and having outer surfaces 108 and 128 respectively. The outer surfaces 108 and 128 are sized slightly smaller than the inner surfaces 64 and 60 thereby permitting the male and female inserts 102 and 122 to be inserted into and secured to the first and second segments 24 and 28 in a coaxially aligned manner.

Furthermore, the inserts are configured to coaxially align the respective segments about a longitudinally central axis as the male insert 102 is mated with the female insert 122, and thus a first segment coupled to a second segment. The male insert 102 can be designed to have a male portion, such as a shaft 106, which corresponds with a female portion of the female insert 122, such as an aperture or receiving portion 126. The inserts can be further designed so that as the shaft 106 is mated with the aperture 126, such as by being inserted into the aperture, the inserts force the segments to coaxially align along a longitudinally central axis.

The male portion and the female portion can further comprise tapered regions 110 and 130 respectively, that facilitate in the mating and coaxial alignment of the male and female inserts 102 and 122. For example the shaft 106 can include a chamfered tapered region 110 (shown in FIG. 3 as a chamfer at the base of the shaft) that corresponds with a chamfered tapered region 130 of the aperture 126, where the natural positioning of the mated chamfered tapered regions guides the inserts towards a coaxially aligned position and orientation. Additionally, the shaft 106 can include a rounded end having all corners or edges removed that permits the shaft to be inserted into the aperture 126 without getting hung up or snagged. The tapered regions provide an ease of assembly advantage because they facilitate the insertion of the male portion within the female portion, thus reducing the potential for misalignment and easing user assembly. The tapered regions further provide an alignment advantage because their natural positioning functions to facilitate coaxially alignment of the segments, thus further easing user assembly by enhancing the natural alignment ability of the segments. In essence, the tapered regions assist the mating of the male and female inserts with one another by guiding the male portion of the male insert 102 into a proper and desired position within the female insert 122 to create a multi-segmented collapsible level having a consistent leveling surface across all of the joined segments and thus the collapsible level as a whole.

Furthermore, the inserts 102 and 122 may be configured to mate with and align with one another regardless of their rotational orientation with respect to one another. In this case, the inserts 102 and 122 may be configured to permit the segments 26 and 28 to be coaxially aligned along a longitudinally central axis, also regardless of their rotational orientation with respect to one another. This is due to the circular cross-sectional geometry of each of the inserts 102 and 122, the male and female portions 106 and 126, and the segments 26 and 28. In other words, the inserts 102 and 122, as so configured, permit a user to orient one segment, coupled with either the male or female insert, at any angular orientation about a longitudinally central axis and mate that segment with an additional segment in a coaxially aligned manner, with the male insert coupled with the female insert, each oriented at any angular orientation about the longitudinally central axis. The inserts 102 and 122, as so configured, also permit individual segments to perform a full rotation in relation to the other segment(s) about the longitudinally central axis while the segments are assembled. This design provides the advantage of being able to assemble the segments of the collapsible level 20 without regard to the rotational orientation of the segments. This also provides the advantage of permitting a user to strategically locate the leveling vials 32 at different angular orientations. For example, if it is desired to rotationally orient one leveling vial in one segment at a position offset 180 degrees from another leveling vial in another segment, each being oriented about the longitudinally central axis, the segments to be joined can be initially oriented such that the leveling vials are initially offset 180 degrees from one another and then the segments joined or, the segments can be mated first and then rotationally adjusted so that the leveling vials are offset 180 degrees from one another.

The inserts are also designed to cooperatively work with the tethering or linking member 38. The aperture 126 in the female insert 122 can be made to longitudinally extend through the female insert 122 (e.g., the aperture 126 may comprise a bore formed through the body of the insert 122). The male insert 102 can similarly be configured to have a body with a bore 118 longitudinally extending through its entirety. The inserts 102 and 122 and the linking member 38, such as the elastic cord 42, can then be coupled or otherwise secured to the segments so that the linking member 38 begins in a position rearward of the male insert 102, extends through the entirety of the male and female inserts 102 and 122 by extending through the hole 118 and aperture 126, respectively, and subsequently ends in a position rearward of the female insert 122. The linking member 38 and inserts 102 and 122 may then be used in combination to facilitate the mating and securing of the segments 24, 26 and 28 in a coaxially aligned and assembled state. As previously discussed, the linking member 38 may be designed and configured to draw the segments together. As the linking member 38 draws the segments together, the tapered regions may facilitate in the mating of the segments by permitting the linking member 38 to draw the male portion of the male insert 102 into the female portion of the female insert 122 without obstruction. The tapered regions may also facilitate in the coaxial alignment of the segments by mating in their natural position as the segments are joined together, which natural position tends to orient the segments in a proper coaxial alignment. In addition, the linking member 38 and inserts 102 and 122 may be made to facilitate and assist in the assembly of the segments from a disassembled state by drawing the segments together towards a coaxially aligned state.

Figure 16A:
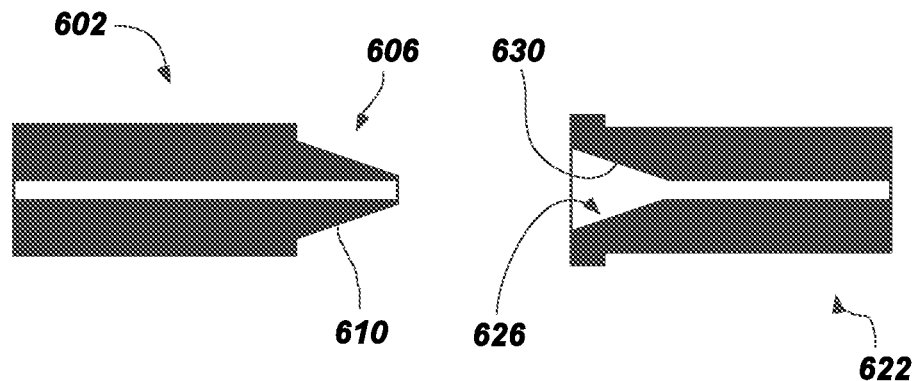
FIG. 16-A illustrates a cross-sectional view of mating male and female inserts formed in accordance with another exemplary embodiment of the present invention.
Figure 16B:
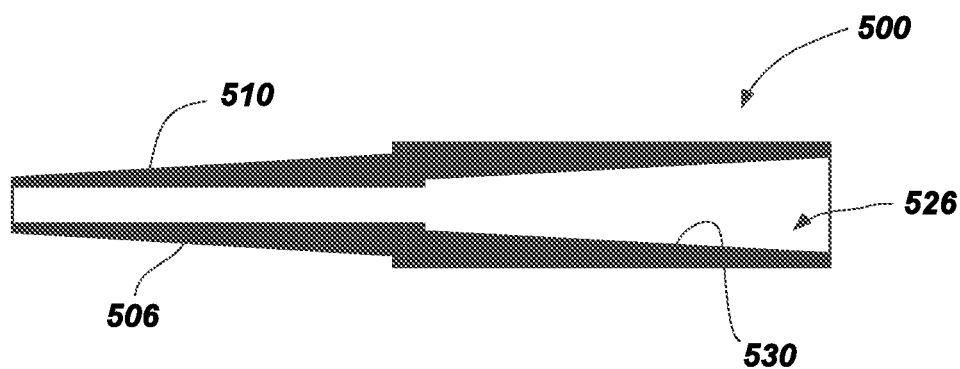

Referring now to FIG. 16-A, illustrated is another embodiment of the male and female inserts 602 and 622. Similar to the previous embodiment, the male insert 602 comprises a male portion configured as a shaft 606 and the female insert 622 comprises a female portion configured as a tapered aperture 626. In addition, the male and female insert 602 and 622 comprise tapered regions 610 and 630 that are greatly enhanced. The enhanced tapered regions facilitate the coaxial alignment of the segments by providing the male insert with a conical shaft 606 and the female insert with a conical aperture 626, whereby the natural position of the mated inserts is when the segments are in proper coaxial alignment. Furthermore, the male and female inserts 602 and 622 are constructed from a material having a circular cross section and may be coupled with the segments of the collapsible level by inserting the inserts within and securing these to the segments. The inserts are further designed and configured to work with a linking member as previously discussed.

Referring now to FIG. 16-B, illustrated is still another exemplary embodiment of an insert of the present invention, wherein the insert comprises a universal configuration. As shown, the insert 500 is operable with the segments of the collapsible level to removably secure and coaxially align the segments of the level. The universal insert 500 comprises both a male portion, configured as a post 506, and a female portion, configured as an aperture 526. The universal insert 500 is further constructed from a material having a circular cross section and sized smaller than the segments of the collapsible level so that the universal insert may be inserted within and secured to the segments. The universal insert 500 is configured so one insert may be inserted into a segment with the male portion extending from the segment and so that another insert may be inserted into a separate segment with the female portion substantially flush with the end of the segment. The corresponding segments may then be coaxially aligned and coupled together by mating the male portion of the one universal insert with the female portion of the other universal insert. The male and female portions are further configured to comprise tapered regions that facilitate in the mating and removably coupling of the segments. The tapered regions may act to coaxially align the segments according to the method previously described. The universal insert and segments may also work with a linking member as previously described.

Referring now to FIG. 5, illustrated is another exemplary embodiment of a collapsible leveling device 320 comprising a first segment 324 and an additional or second segment 328, each one of these having square cross-sectional geometries. The collapsible level 320 is shown also as comprising an elastic shock cord 342, a male insert, 402 and a female insert 422. The male insert 402 further comprises a male portion, such as a shaft 406, with the male portion having tapered regions 410 to facilitate mating and alignment with a corresponding female insert. The female insert 422 further comprises a female portion, such as an aperture 426, with the female portion also having tapered regions 430 to facilitate mating and alignment with a corresponding male insert. As in the previous embodiment, the aperture 426 may be configured to extend through the entirety of the female insert and a hole (not shown) may be configured to extend through the entirety of the male insert so that the linking member may extend through the entirety of both the male and female inserts 402 and 422, wherein the linking member begins in a location rearward one of the inserts and ends in a location rearward the other insert as previously described. The collapsible level 320 is also designed so that the individual segments may be assembled at a plurality of rotational orientation with respect to a longitudinally central axis. As shown in FIG. 4, the segments may be assembled in four rotational orientations, these being defined by the four planar sides of the segments.

Figure 6:
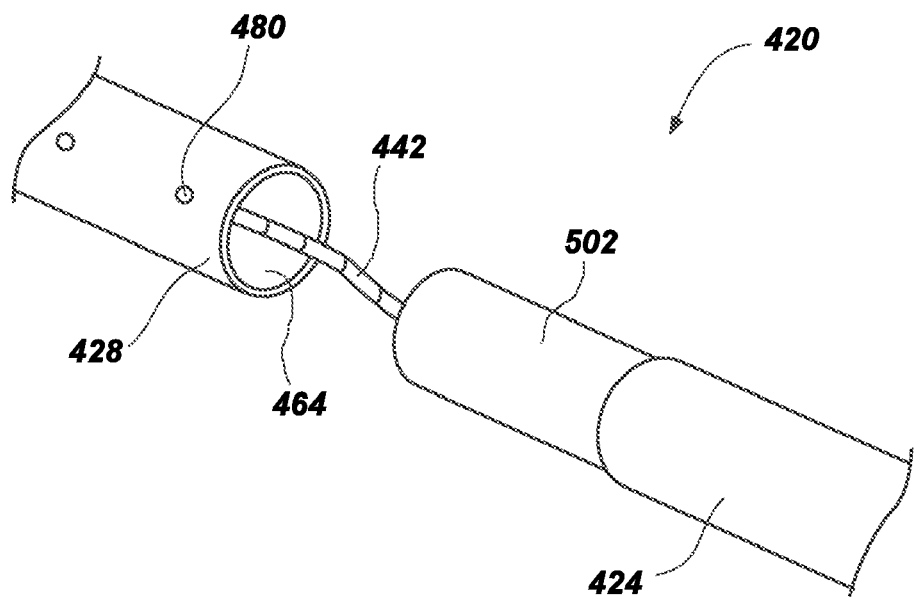
FIG. 6 illustrates a partial perspective view of an exemplary collapsible level in a disassembled state, with one exemplary means for locking, or at least securing, connecting segments of the collapsible level.

With reference to FIG. 6, illustrated is another exemplary collapsible level. As shown, the collapsible level 420 comprises means for removably coupling the segments of the collapsible level. Specifically illustrated are a first end segment 424, a second end segment 428, a male insert 502, and an elastic cord 442 tethering or linking the first end segment 424 and the second end segment 428 in a disassembled state. The segments are configured such that the first segment 424 comprises a male insert 502 having a male portion extending from the end of the first segment 424, wherein the first segment 424 is removably coupled to the second segment 428 by inserting the male portion of the male insert 502 into the tube-like structure of the second segment 428. The second segment 428 comprises a plurality of locking nubs 480 formed in its tubular body, which nubs 480 function to removably secure the male portion of the male insert 502 of the first segment 424 by providing an interference or force fit. The locking nubs 480 may be constructed by deforming a small portion of the tubular body of the second segment 428 such that an indentation is formed on the outer surface of the segment with the indentation protruding slightly inward the inner surface 464. The protrusion of the locking nubs 480 inward and about the inner surface 464 of the second segment 428 facilitates a proper orientation of the first and second segments 424 and 428 by engaging the male insert 502 and, as indicated, providing an interference fit between the male insert 502 and the second segment 428. A plurality of locking nubs may be formed in the second segment 428 to removably couple the male insert 502 and the first segment 424.

The second segment 428 comprises an inner diameter in its tubular body that is sized slightly larger than the outer diameter of the male portion of the male insert 502, such that the second segment 428 is capable of receiving the male portion of the male insert 502. As shown in FIG. 6, the first segment 424, second segment 428, and male insert 502 may be constructed of circular tubing with the male insert 502 secured to the first segment 424. The elastic cord 442, similar to that described above, can be secured to the first and second segments 424 and 428 such that the elastic cord 442 tethers the segments together, even when the segments are not actually physically coupled to one another.

Figure 7:
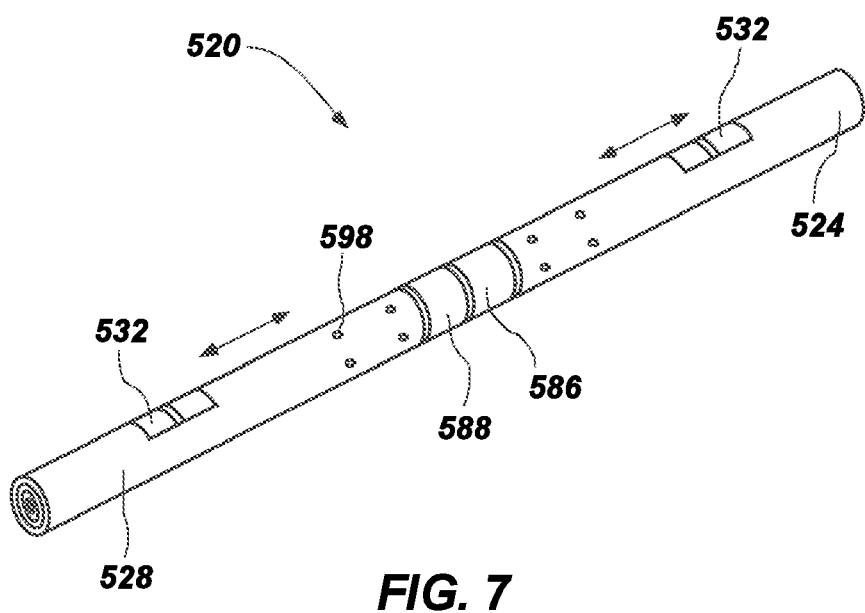
FIG. 7 illustrates a perspective view of an exemplary collapsible level in an assembled state, wherein the collapsible level comprises an extension means for longitudinally lengthening and shortening (e.g., telescoping) the collapsible level, and wherein the collapsible level is positioned in an unextended state.
Figure 8:
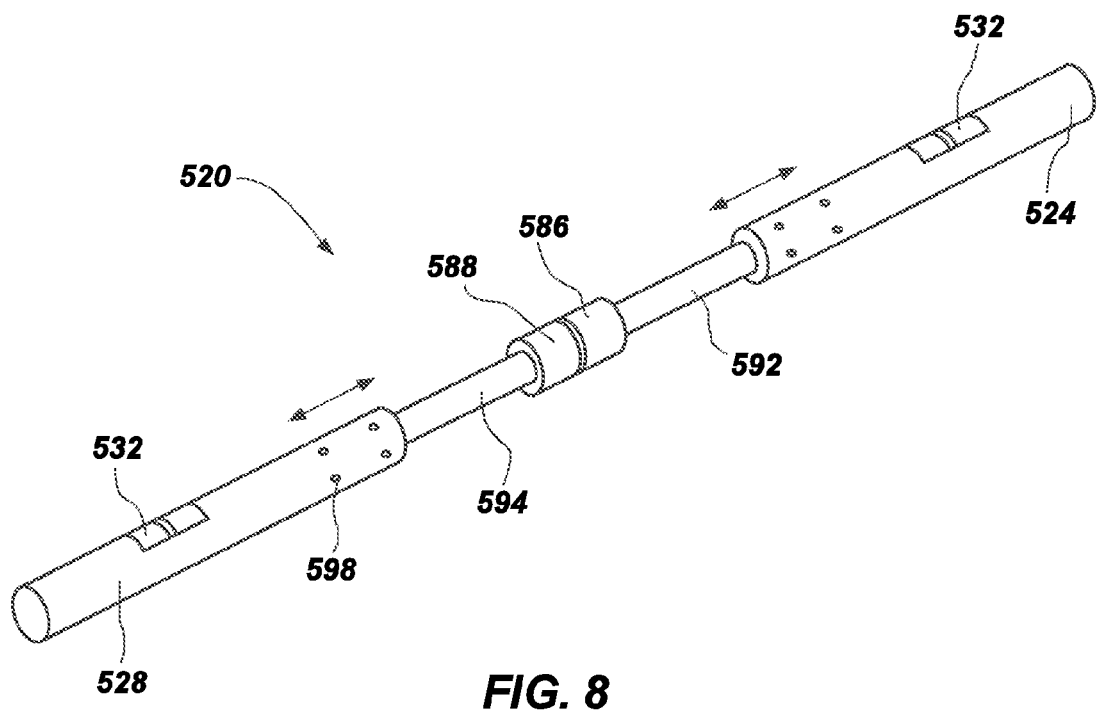
FIG. 8 illustrates a perspective view of the collapsible level of FIG. 7, shown in an extended state.
Figure 9:
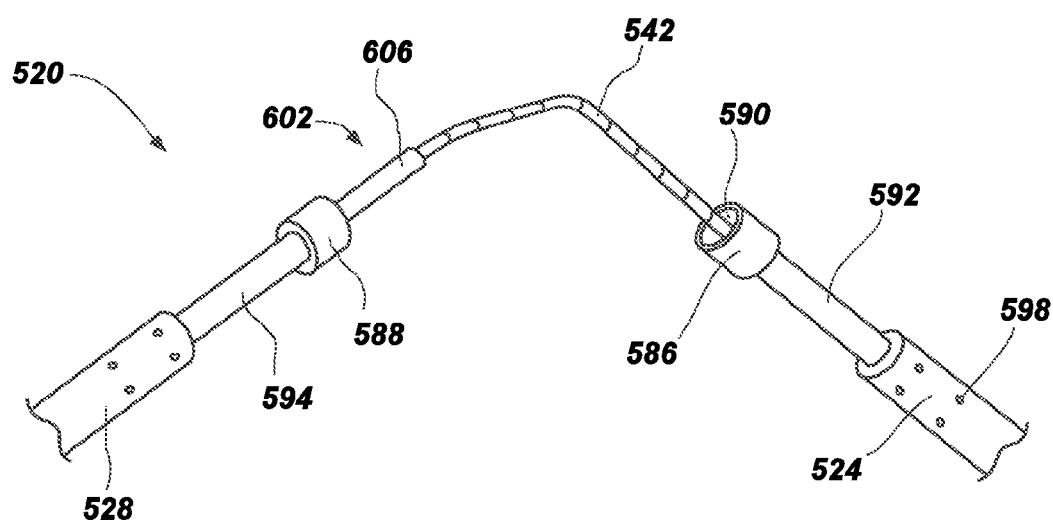
FIG. 9 illustrates a perspective view of the collapsible level of FIG. 7, shown in a disassembled and extended, and tethered or linked, state.

Referring now to FIGS. 7-9, illustrated is a collapsible level in accordance with yet another exemplary embodiment of the present invention. In this particular embodiment, the collapsible level 520 comprises extension means configured to longitudinally enable the extending or lengthening of the collapsible level 520. The extension means is capable of permitting the collapsible level to occupy any position between an un-extended and fully extended state. Specifically, the collapsible level 520 comprises a first segment 524, a second segment 528, a series of leveling vials 532, a first inner tubular member 592 receivable within the first segment 524, a second inner tubular member 594 receivable within the second segment 528, and first and second attachment members 586 and 588, respectively, wherein the first and second segments 524 and 528 operate with the first and second inner tubular members 592 and 594 to permit longitudinal extension of the collapsible level 520, and wherein the first and second attachment members 586 and 588 couple the segments of the collapsible level 520 together. The first and second segments 524 and 528 and the first and second inner tubular members 592 and 594 can be constructed of tubing having a circular cross-section, with the first and second segments 524 and 528 being sized larger than the first and second inner tubular members 592 and 594, such that the first and second inner tubular members 592 and 594 may be inserted into the first and second segments 524 and 528, respectively, in a manner to permit slidable adjustment of the inner tubular members within the respective segments. The inner tubular members may then be slidably adjusted in a telescoping manner with respect to the corresponding segments. The inner tubular members 592 and 594 may further comprise stops (not shown), such as end stops, coupled to the ends of the inner tubular members 592 and 594, and that are inserted into corresponding segments, wherein the stops function to restrict the segments and corresponding inner tubular members from extending beyond a maximum length.

The first and second inner tubular members 592 and 594 may also be non-removably coupled with the first and second attachment members 586 and 588, respectively, to link the various segments of the collapsible level together. One of the first or second attachment members 586 and 588 may be coupled with a male insert 602 and the other of the first or second attachment members can include an inner surface such that the segments may be removably attached by inserting the insert 602 into the appropriate attachment member. Specifically shown in FIG. 8 is the second attachment member 588 coupled with a male insert 602 comprising a shaft 606. The male insert 602 and shaft 606 comprise circular cross-sections. Also shown is the first attachment member 586 comprising an inner surface 590 that also has a circular cross-section, and that is sized larger than the shaft 606 of the male insert 602. The segments of the collapsible level 520 may be removably attached by inserting the shaft 606 into the appropriate attachment member as previously presented. With the various segments of the collapsible level attached, select individual segments may then be longitudinally lengthened by sliding the inner tubular member within the corresponding segment. As shown in FIG. 8, the collapsible level 520 may then be adjusted to occupy any length between an un-extended position, where the inner tubular member is contained entirely within the segment, and a fully extended position, where the inner tubular members and corresponding segments are extended to their maximum length as defined by the presence of one or more stops. The level may further be configured to extend an additional amount by fitting the level with a long shaft 606 and sliding the shaft in relation to the inner surface 590 so that a substantial portion of the shaft is exposed while a portion of the shaft is maintained within the inner surface, thereby maintaining the assembled relationship between the segments.

Specifically shown in FIG. 9 is the collapsible level 520 as comprising the extension means previously presented, with the first and second segments 524 and 528 of the collapsible level 520 in an extended position, and the segments 524 and 528 of the collapsible level in a disassembled or uncoupled state. Particularly, the collapsible level 520 is shown as comprising the extension means previously presented, which allows the collapsible level 520 to longitudinally lengthen or extend in a telescoping manner. The collapsible level 520 is shown as further comprising a tethering or linking member in the form of an elastic cord 542, which functions as discussed above to tether or link the various segments together while in a disassembled or uncoupled state. The first and second attachment members 586 and 588, the male insert 602, and shaft 606 may be configured to permit the elastic cord 542 to extend through the entirety of the male insert 602 and attachment members 586 and 588, such that the elastic cord 542 initiates at a position rearward the male insert 602 and ends at a position within the interior of the opposing segment not containing the male insert 602. As previously presented, the elastic cord 542 may be configured to cause the segments to be drawn together, thus biasing the segments towards an assembled or coupled state.

FIGS. 7-9, further illustrate the collapsible level 520 and extension means as comprising nubs 598 for facilitating alignment of corresponding segments to be coupled together, as well as for securing the position of the segments and corresponding inner tubular members in one of a plurality of positions, thus locking or securing the collapsible level in one of a plurality of extended positions. As previously discussed, the nubs 598 may be formed by creating one or more indentations in the segments, thus forming corresponding protrusions, such that the nubs are caused to provide or create an interference fit between the segments and the inner tubular members interacting therewith, thereby locking or securing the collapsible level in a desired extended or un-extended position. The collapsible level can be configured to include any number of nubs as needed to properly secure the position of the segments with respect to one another. Alternatively, the level may be configured to include a known rotational style locking mechanism as a means for locking the segments in a desired extended or un-extended position. For example, the inner tubular members (e.g. the first inner tubular member 592) could be extended to a desired length and locked in position by rotating the inner tubular members either clockwise or counter-clockwise with respect to the corresponding segments (e.g. the first segment 524), and thereby actuating the rotational locking mechanism. Similarly, the inner tubular members could be unlocked from a locked position by rotating the inner tubular members in the opposite direction with respect to the corresponding segments. Of course, other means for locking the segments in an extended or un-extended position are contemplated herein, such as through the use of detents.

The collapsible level 520 can be configured to comprise any number of segments having extension means formed therein. Indeed none or one or all of the segments may comprise extension means. For example, a collapsible level could be constructed comprising a central segment and first and second end segments, with the first and second end segments comprising extension means. Alternatively, the central segment may comprise extension means with the first and second end segments being non-extendable. Obviously any number of segments and extension means can be used to produce a collapsible level capable of longitudinal extension. Therefore, the foregoing description and the corresponding drawings are not intended to be limiting in any way.

Referring now to FIGS. 10-14, illustrated are various accessory devices in accordance with several exemplary embodiments, wherein the accessory devices operate to provide or facilitate additional utility with respect to the collapsible level and utility device, thus enhancing the functionality of the collapsible level. The accessory devices are preferably configured to be removably attachable to the collapsible level, as well as to slide in a bi-directional manner along the longitudinal length of the collapsible level, and particularly about the several segments making up the collapsible level. The accessory devices each comprise a housing and at least one aperture formed in the housing that is capable of receiving one or more segments therein. As such, the at least one aperture has a cross-sectional geometry that is substantially the same as that of the segments of the collapsible level, thus allowing the accessory to couple to and to be adjustable along the length of the collapsible level.

Figure 10:
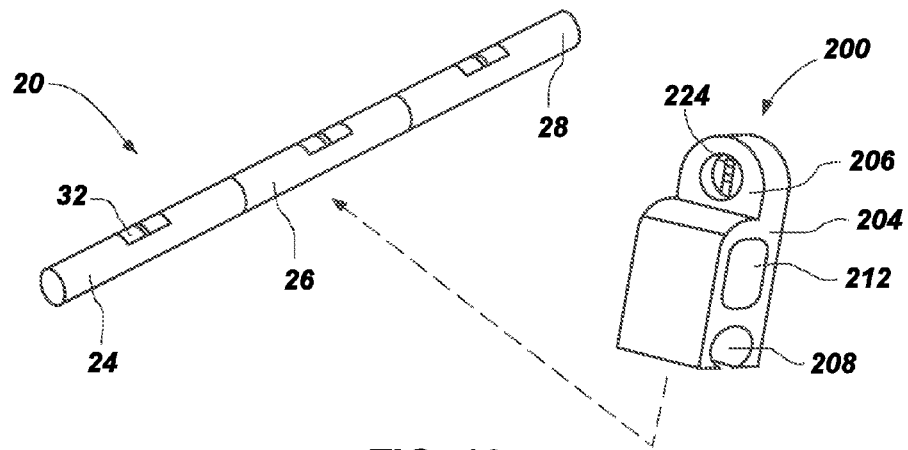
FIG. 10 illustrates a perspective view of an exemplary accessory device operable with a corresponding exemplary collapsible level, wherein the accessory device may be used to enhance the functionality of the collapsible level.
Figure 11A:
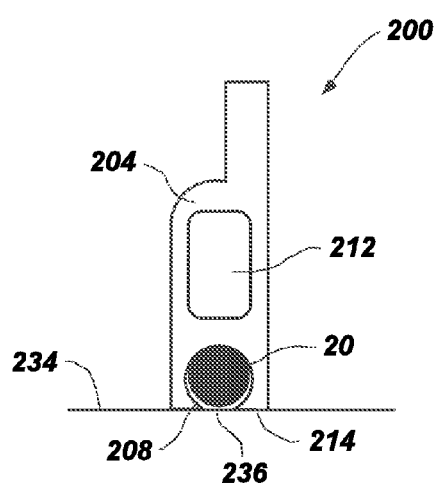
FIG. 11-A illustrates a side view of an exemplary accessory device as removably coupled to a collapsible level, wherein the collapsible level is inserted within an aperture formed in the accessory device.
Figure 11B:
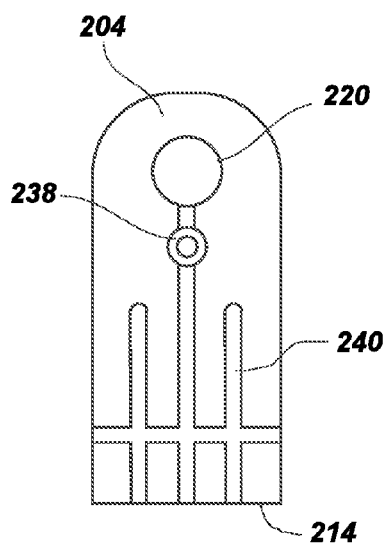
Figure 11C:
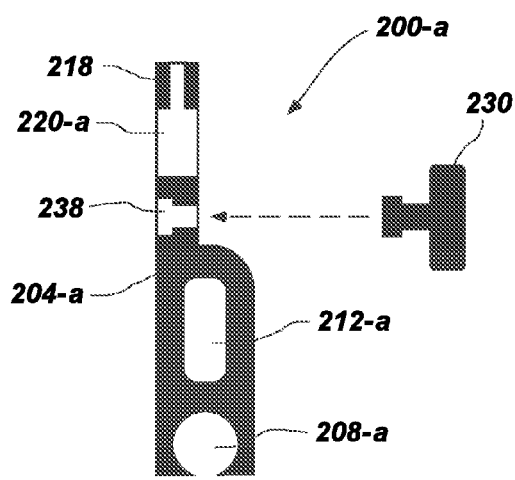

With specific reference to FIGS. 10 and 11-A, shown is an exemplary accessory device 200 operable with an exemplary collapsible level 20, similar to the one described above and shown in FIGS. 1-3. The accessory device 200 is shown as comprising a housing 204 having apertures 208 and 212 formed therein. The accessory device 200 optionally further comprises a leveling vial 224 supported in an extension member 206.

The aperture 208 formed in and extending through the housing 204 has substantially the same cross-section as the various segments of the collapsible level 20, and is shown as being attached to the collapsible level 20. The aperture 208 is shaped and sized such that when the accessory device 200 is attached to the collapsible level 20, a bottom surface 214 of the housing 204 resides on a plane 234 level or flush with the leveling surface 236 of the collapsible level 20. One advantage of this design is that the accessory device 200 can function to restrict the rotational movement of the collapsible level 20 about a leveling surface. In other words, the accessory device 200 can prevent the collapsible level 20 from undesirable rotation when attached to the collapsible level 20 and placed on a leveling surface. An additional advantage is that the accessory device 200 is maintained in a position substantially perpendicular to the leveling surface, thus allowing the accessory device 200 and the collapsible level 20 to be used as a reference for perpendicular measurements.

In addition, the substantially perpendicular relationship of the accessory device 200 and the leveling surface 236 can further facilitate other leveling functions. For example, when the accessory device 200 is fitted with a leveling vial 224, the accessory device 200 and the collapsible level 20 can each function to level multiple oriented surfaces. A specific example according to one embodiment of the present invention involves a collapsible level that comprises a leveling vial designed to level horizontal surfaces and an accessory device that comprises a leveling vial designed to level vertical surfaces. In this embodiment, the accessory device may be attached to the collapsible level and a horizontal surface may be leveled with the accessory device functioning to resist rotational movement of the collapsible level. The collapsible level and accessory device may also be placed against a vertical surface, where the accessory device is positioned perpendicular to the leveling surface, thus allowing the vertical surface to be leveled.

It is contemplated that the accessory device 200 can be fitted with and can support a variety of differently oriented leveling vials to permit the accessory device and collapsible level to level a plurality of oriented surfaces. Alternatively, the accessory device 200 may be fitted with a single adjustable leveling vial that permits the orientation of the leveling vial to be adjusted, thus permitting the collapsible level 20 and the accessory device 200 to level a plurality of surfaces. Still further, the accessory device 200 may be fitted with and support a circular (i.e. bulls eye) level. In addition to the aperture 208 being substantially the same cross section as the collapsible level 20, the aperture 208 may further be configured to be substantially the same size as the collapsible level 20. This configuration would again function to permit the accessory device 200 to be removably attached to the collapsible level 20, but would also provide a slight interference fit between the collapsible level 20 and the accessory device 200, thereby allowing the accessory device 200 to slidably adjust and to be substantially secured or locked in a position about the various segments of the collapsible level 20.

The housing 204 may further include a slot 212 that extends through the housing, and that functions to operate with the aperture 208 to releasably secure the segments of the collapsible level 20 once broken down and present in a disassembled or uncoupled state. The accessory device 200 can be configured so that the aperture 208 engages and secures a single segment of the collapsible level, with the slot engaging and securing the remaining segments of the collapsible level. As such, the slot may comprise a size that is larger than the aperture 208, and that is capable of accommodating multiple segments (see FIG. 12).

Figure 12:
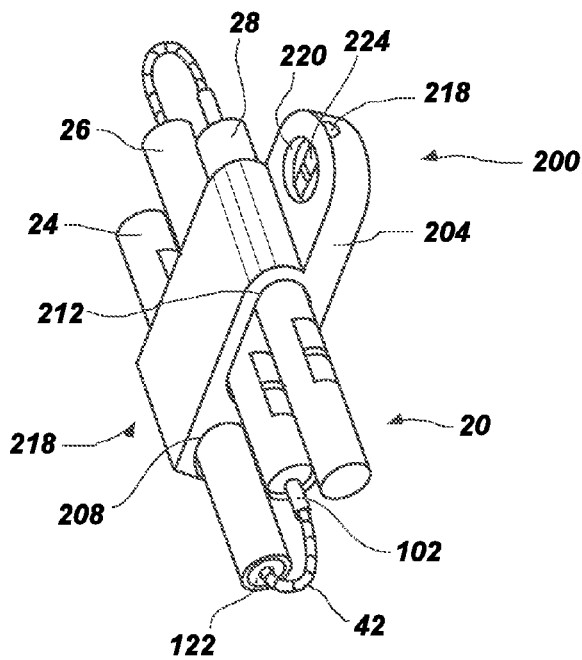
FIG. 12 illustrates a perspective view of an exemplary accessory device as supporting an exemplary collapsible level, wherein the segments of the collapsible level are secured within apertures of the accessory device.

FIGS. 11-A and 12 illustrate the relationship of the aperture 208 to the slot 212, in addition to the different configuration of these. FIG. 12 illustrates the various segments of the collapsible level 20 as being contained within and supported by the accessory device 200 in a stored position. As shown, the collapsible level 20 comprises a central segment 26, and first and second segments 24 and 28, respectively, each of which couple together via corresponding male and female inserts (such as male and female inserts 102 and 122), and each of which are tethered or linked via an elastic cord 42. The aperture 208 is shown as being sized and configured to receive and secure the first segment 24, with the slot 212 shown as being sized and configured to receive and secure the remaining segments, namely the central segment 26 and the second segment 28. In this arrangement, the various segments of the collapsible level are efficiently contained and stored for convenient transport and for later use.

In an alternative embodiment, the accessory device 200 may be configured with attachment means located on the exterior surface of the housing 204 for releasably securing the segments of the collapsible level. For example, channels having cross-sectional geometries sized and shaped to correspond to the cross-sectional geometries of the various segments of the collapsible level may be formed in the outer surface(s) of the housing 204 of the accessory device 200. In another example, the segments may be secured to the housing 204 of the accessory device 200 via magnets supported about the housing.

With reference to FIG. 11-B, the accessory device 200 may further comprise one or more indicia 240 located on or formed within an exterior surface of the housing 204 that permits the accessory device 200 to perform other convenient leveling functions, such as being used with a laser level 250 to level a surface of an object (see surface of object 2 in FIG. 13), wherein the accessory device 200 functions as a target for the laser beam, and the indicia 240 provides referencing feedback to the user. The indicia 240 may include a plurality of grooves cut into a surface of the housing 204 with some of the grooves running parallel with the bottom surface 214 of the housing 204 and other grooves running perpendicular with the bottom surface 214 of the housing 204. The grooves may be configured to intersect one another at various locations. Alternatively, the indicia 240 may comprise markings painted or printed onto the surface of the housing 204, or adhesive stickers adhered to the surface of the housing 204.

As illustrated in FIG. 13, the accessory device 200 and laser level 350 are designed to cooperatively level a surface by comparison of laser beam marking on the surface of the accessory device 200. To accomplish the level operation, the laser level 350 is placed on a surface and leveled in relation to that surface. The accessory device 200 is then positioned on a surface and a laser beam is directed from the laser level 350 to the surface of the accessory device 200, the beam being referenced by one of the indicators 240. The accessory device 200 is then positioned at a different location and the laser beam is again directed at the accessory device 200, with the beam location being noted. The respective positions of the two different laser marks on the surface of the accessory device 200 may then be compared to determine the levelness of the surface. The indicia 240, such as the grooved surface of the housing 204, facilitates in referencing the laser beam location on the surface of the housing 204. The laser level 350 and accessory device 200 can be cooperatively used to level the same surface, such as a substantially large surface, or they can be used to level objects in relation to each other, such as separate, independent surfaces.

The indicia 240 on the surface of the housing 204 of the accessory device 200 may further be used to provide a visual approximation of the levelness of a surface. For example, the accessory device 200 can be placed at a first location and a user can visually detect the positioning of the indicia 240 with respect to the surface. The accessory device 200 may then be placed at a second location and a user can visually detect the positioning of the indicia 240 with respect to the second location. The user may then compare this with the first position of the indicia 240.

As also shown in FIG. 13, the accessory device 200 can be configured to include an internally supported laser emitting device 260, thus removing the requirement for an additional leveling device to be purchased, and allowing the accessory device to cooperate with other objects to level a surface as described. In one application, multiple accessory devices, with at least one of these comprising a laser emitting device, may be used to level a surface. It should be noted that the accessory device 200 is not always required to be present or supported about the collapsible level to be useful. Indeed, the accessory device 200 may be used independent of the collapsible level for certain measurements. For example, in the case where the accessory device supports a bulls eye leveling vial, the accessory device may be removed from the collapsible level, turned on its side and then placed on a surface to measure the levelness of the surface as indicated by the bulls eye leveling vial. In another example, multiple accessory devices can be used to level a surface or surfaces. For instance, an accessory device can be placed on one surface and a different accessory device can be placed on a different surface and the pair of accessory devices can be compared through the use of a laser level or visually to level the surfaces with respect to one another.

With reference to FIG. 11-C, illustrated is an accessory device formed in accordance with another exemplary embodiment. In this particular embodiment, the accessory device 200-*a* comprises a housing 204-*a* having formed therein a vial housing 220-*a* and a pocket 218 receiving and supporting a leveling vial (see leveling vial 224 of FIG. 10). The accessory device 200-*a* is further shown as comprising a knob 230 configured to be received within or inserted into a corresponding aperture 238. The knob 230 is configured to removably couple with the accessory device by inserting the knob into the corresponding aperture, such as by screwing the knob into a threaded aperture. The knob is also capable of coupling a laser leveling device (not shown), such that a laser leveling device may be coupled with the knob and the knob coupled to the accessory device, thereby permitting a laser leveling device independent of the accessory member to be removably coupled with the accessory member. In addition, the knob may be used to orient the laser leveling device with respect to the accessory device or collapsible level, if the accessory member is coupled with the collapsible level. For example, the laser leveling device can be oriented at an angular orientation with respect to the leveling surface of the collapsible level (e.g. a 90 degree orientation) by coupling the accessory member with the collapsible level, coupling the laser leveling device with the knob, and screwing the knob into the threaded aperture 238 until the laser leveling device attains the desired orientation.

The pocket 218 may be substantially the same shape as the leveling vial and sized slightly larger so that the leveling vial can be inserted therein, and into the vial housing 220-*a*. The pocket 218 is designed to connect with the vial housing 220-*a* in a manner to permit the leveling vial to be inserted into and through the pocket, and subsequently supported within the vial housing. The vial housing may be configured to receive and secure the leveling vial in position such that the leveling vial may be used with the accessory device to level one or more surfaces. The vial housing may be circular in shape and sized larger than the leveling vial such that the leveling vial is easily visible while the leveling vial is secured within the vial housing and when it is used in a leveling operation.

Referring again to FIG. 12, illustrated is an accessory device 200 having a housing 204 supporting a leveling vial 224 that has been inserted into a pocket 218 and secured within a vial housing 220. The pocket 218 is shown as being positioned substantially at the top of an extension of the accessory device such that the leveling vial is supported within the accessory device at a position perpendicular to the bottom surface 218. However, the pocket may be configured to be located at other orientations, such as 45 degrees from the bottom surface. Still further, the housing may be configured with multiple pockets so as to permit the leveling vial to be used in one orientation and removed and relocated to another orientation as desired for different leveling functions. Alternatively, the housing 204 may not include a pocket, but rather an adjusting vial housing 220 supporting a leveling vial therein, wherein the leveling vial may be selectively adjustable about several positions to achieve different orientations and different leveling functions. This may be achieved by providing a first member configured to support the leveling vial, wherein the first member is rotatably supported within the housing 204, and that facilitates manual rotation of the first member to effectuate adjustment of the leveling vial.

Figure 14:
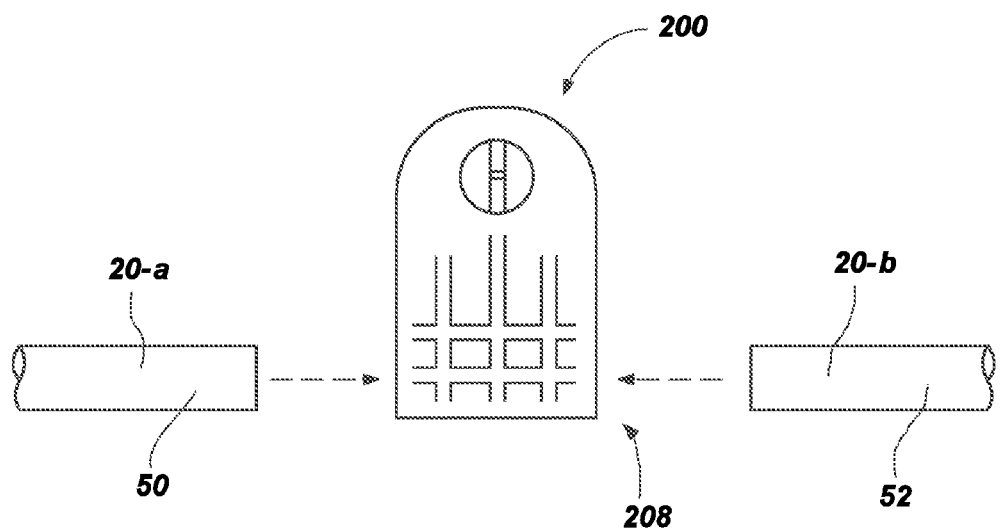
FIG. 14 illustrates an exploded front view of an exemplary accessory device as coupling together individual or separate levels, wherein the accessory device is coupling with ends of the individual or separate levels to form an extended level.

With reference to FIG. 14, the accessory device 200 may also be used to couple two separate or individual collapsible levels together in a manner to effectively form a single, lengthened collapsible level. Selected ends of the two individual levels may be inserted into the aperture 208 of the accessory device 200 to form the extended level, wherein the accessory device 200 secures the respective segments of the individual collapsible levels in place. Specifically, as shown, an end 50 of a segment of a first collapsible level 20-*a* may be inserted into the aperture 208 and secured within the accessory device 200, such that the end 50 of the segment occupies approximately half of the interior of the aperture 208. Similarly, an end 52 of a segment of a second collapsible level 20-*b* may be inserted into an opposite end of the aperture 208 and secured within the accessory device 200, such that the end 52 of the segment occupies approximately the other half of the interior of the aperture 208. As previously described, the aperture 208 may be configured to be substantially the same size and shape as the segments of the individual collapsible levels so that as the ends of the segments are inserted into the interior of the aperture 208, the aperture 208 secures the position of the segments with respect to one another and in relation to the accessory device 200. In this manner, the accessory device 200 can be used to couple separate collapsible levels together to essentially form a single, lengthened collapsible level. Additionally, multiple accessory devices can be used to couple multiple collapsible levels together to form an extended or lengthened level of any desired length.

Figure 15:
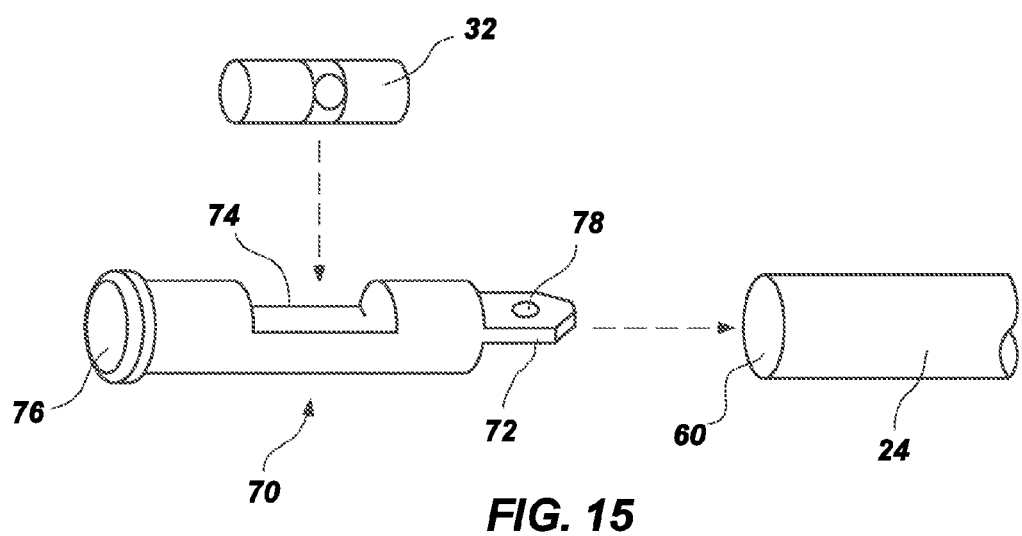
FIG. 15 illustrates a perspective view of an exemplary end insert configured for insertion into an end of a segment of a collapsible level, wherein the end insert supports the leveling vial and couples a tethering or linking member.

Referring now to FIG. 15, illustrated is an exemplary end insert 70 capable of removably coupling with a segment of a collapsible level, wherein the insert 70 may be configured to support the leveling vial 32 and secure the linking member (not shown). The end insert 70 may be inserted into the end of one of the segments of the collapsible level. As previously described, the segments of the level may be constructed of tubing having a circular or other cross-section. In addition, the end insert 70 may also be constructed to have a similar cross-section, but sized smaller than that of the segments of the collapsible level in order to permit the end inset 70 to be inserted within one of the segments. FIG. 15 shows a first segment 24, having an inner surface 60, wherein the end insert 70 is configured to be inserted into the interior of the first segment 24, being supported by its inner surface 60. In a preferred embodiment, each of the end segments of a collapsible level comprise an end insert supported therein, such that in an assembled state, the collapsible level has an end insert at each opposing end. A linking member may be coupled to each end insert, and extend through the various segments of the collapsible level as described herein and shown in the drawings.

FIG. 15 also illustrates the end insert 70 as being configured to receive and support a leveling vial 32. The end insert 70 may be configured to include a vial window 74 that receives the vial and supports the vial in a manner to allow a majority of the vial to be visible to a user. The vial window 74 formed in the end insert 70 may be shaped and sized to correspond with a similar window (not shown, but see FIG. 1) formed in the supporting segment, each of which facilitate viewing of the leveling vial by a user. Supporting the leveling vial within the end insert functions to allow the leveling vial to be removed from the collapsible level and replaced if necessary, simply by removing the end insert and interchanging vials. The end insert 70 may further include a flange 72 having a hole 78 formed therein, wherein the flange and the hole are capable of coupling and securing a linking member, such as the linking members described above. The linking member may be coupled with the flange 72 by threading one end through the hole 78 and tying to prevent the linking member from releasing from the hole and the insert. As will be recognized, the linking member may be secured to the insert using other means commonly known in the art. The end insert 70 may further include a cap 76 located on the end of the end insert that functions as a stop to retain the insert in place with respect to the supporting segment, and to prevent the entire end insert sliding into the interior of segment(s) of the collapsible level.

In some exemplary embodiments, the collapsible level may be configured to inherently assist in the coupling of its several segments. In such embodiments, the linking member may be designed and configured to provide an elastic function, wherein the linking member is supported in a pre-stretched state, or that enters a stretched state as the various segments are uncoupled and folded upon one another. The linking member, as stretched, introduces a tension force on each of the various segments, which tension force functions to cause the separate segments to be drawn together. As the segments are drawn together, they may be guided into proper alignment and position with respect to one another, and subsequently coupled together. Guiding of the segments into proper alignment and position may be done manually, or with the assistance of the configuration of the inserts, as discussed above. Once properly aligned and positioned, the segments may be coupled and secured together to form an assembled collapsible level. In the event the several inserts are configured to facilitate alignment, each of the segments may be coupled together and the collapsible level assembled simply by grasping an end section and manipulating the various other segments under gravity.

Figure 17A:
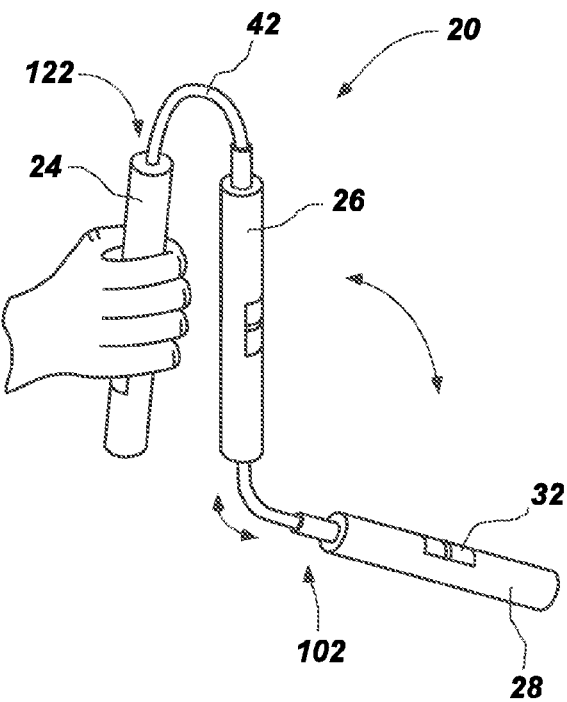
FIG. 17-A illustrates a perspective view of a collapsible level being grasped by a user in a disassembled state.
Figure 17B:
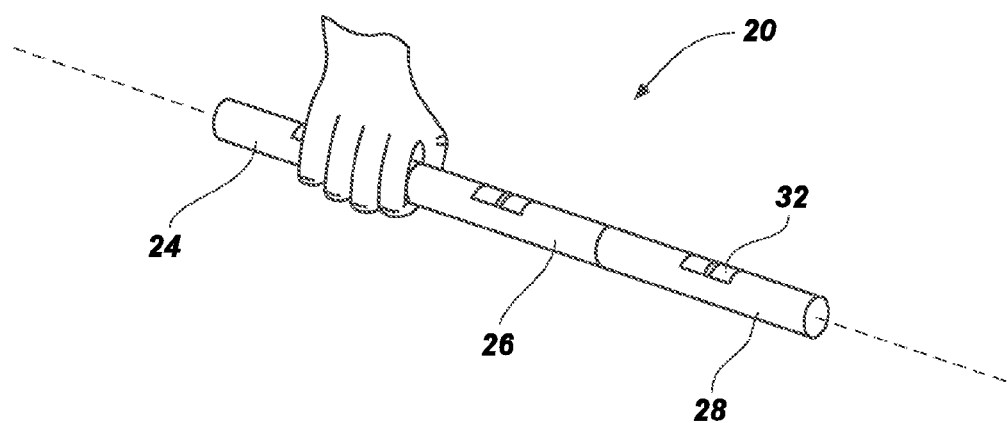

With specific reference to FIGS. 17-A and 17-B, illustrated are three separate segments being assembled to form the collapsible level 20. As shown, an end segment of the collapsible level 20 is grasped by a user. Specifically illustrated is the central segment 26 and first and second end segments 24 and 28 linked by the elastic cord 42. The various segments also comprise appropriate male and female inserts and a series of leveling vials 32. The linking member, being in the form of an elastic shock or bungee cord 42, assists in the inherent assembly of the segments by drawing the segments together when they are let go by the user, wherein the various segments are properly aligned, as they come in contact with one another, by the respective inserts of opposing segments coming into contact with one another. The configuration of the inserts facilitates their coaxial alignment and mating, thus facilitating the same for the several segments. In this way, the collapsible level is capable of being assembled by a user using only one hand. FIG. 17-A shows the segments of the collapsible level disassembled, but tethered by the elastic cord. Also shown is the first end segment 24 being grasped by a user's hand. FIGS. 17-A and 17-B, taken together, show that the first end segment 24 may be repositioned, wherein the repositioning of the first end segment 24 manipulates the central and second end segments 26 and 28, thus causing them to be drawn together and aligned via the shock cord 42. Suitable manipulation will cause each of the separate segments to align and eventually coupled together to assemble the collapsible level.

Stated differently, the repositioning of the first end segments causes the assembly of the separate segments by permitting the elastic cord to draw the separate segments together. The elastic cord is configured to bias the segments toward the assembled state by providing an elastic force. The elastic force is produced by securing the cord within the segments so that it stretches when the segments are disassembled. The elastic force is designed so that the segments may be drawn together, align, and actually couple together when the segments reach a certain orientation with respect to one another. For example, the elastic cord may be designed to draw corresponding segments together and align them for subsequent coupling when the angle between the longitudinal axis of the respective segments is within a certain range. Selective repositioning and manipulation one of the segments in relation to a corresponding segment functions to position each of these within a desired orientation with respect to one another, thus permitting the elastic force to draw the segments together and eventually cause the inserts to mate and the segments to couple. To effectuate or enhance the inherent assembly of the collapsible level, the inserts are preferably configured with one or more tapered regions, which allow contacting inserts of opposing segments to more easily slide upon one another and to eventually mate. In other words, the tapered regions reduce the likelihood of structural obstruction and resistance that may otherwise exist as caused by opposing segments, and particularly opposing inserts, coming in contact with one another. As such, the tapered regions effectively facilitate in the drawing and eventual coupling together of the several segments. As mentioned, the inserts, specifically the tapered regions, also facilitate proper alignment of the segments along their longitudinal central axis. FIG. 17-B shows the collapsible level 20 fully assembled and properly aligned along a longitudinal central axis with the first and second end segments 24 and 28 attached at opposing ends of the central segment 26.

Figure 18:
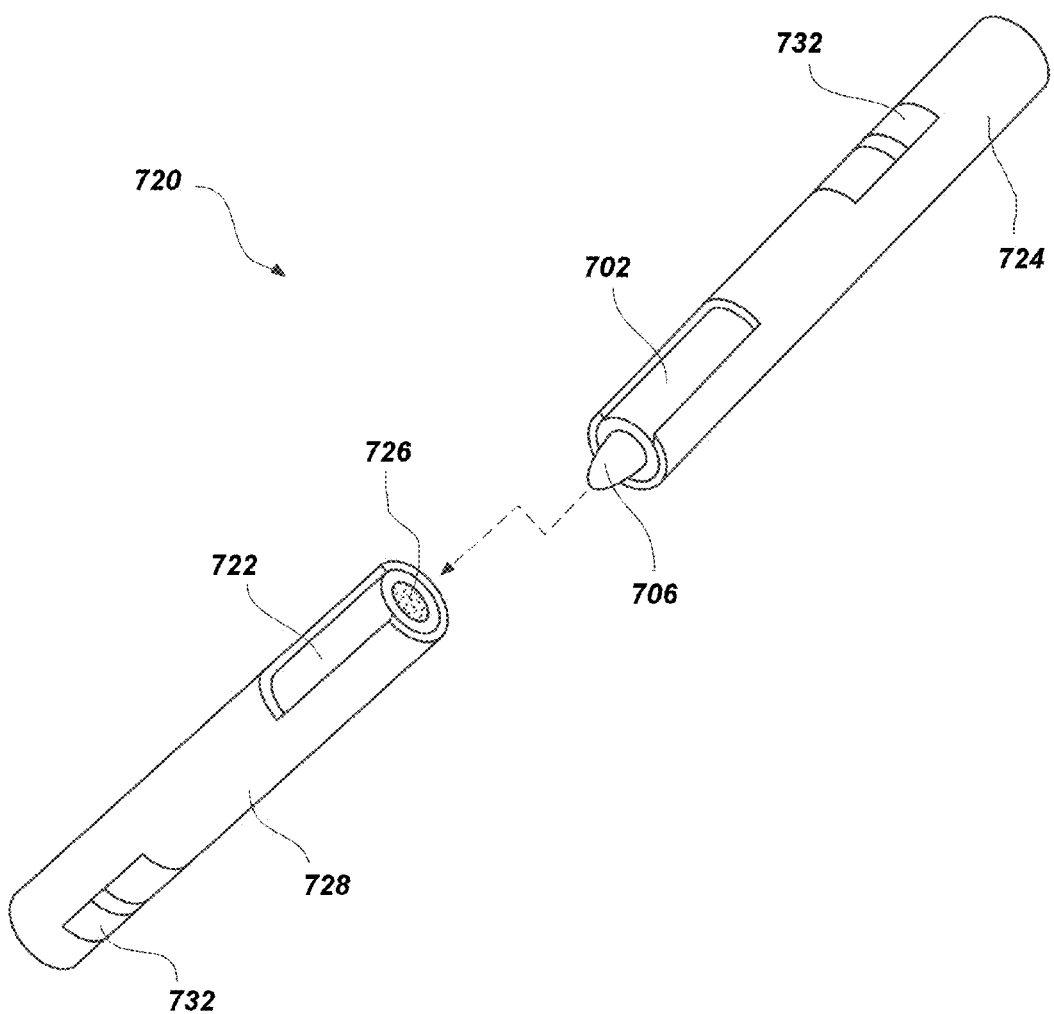
FIG. 18 illustrates an exploded, perspective view of two segments of another exemplary embodiment of the collapsible level configured to couple to one another magnetically via corresponding male and female inserts.

Referring now to FIG. 18, illustrated is a collapsible level in accordance with yet another exemplary embodiment of the present invention. In this particular embodiment, the collapsible level 720 comprises a first end segment 724, a second end segment 728, a series of leveling vials 732, and male and female inserts 702 and 722 as previously presented. In addition, the male and female inserts comprise male and female portions 702 and 726 respectively that function to facilitate in the mating and alignment of the collapsible level as previously presented. The collapsible level 720 may also be configured to include the telescoping feature, end inserts, male and female inserts or universal insert, and accessory device as previously presented. Indeed a variety of collapsible levels having any number of segments and features is contemplated herein. Furthermore, the segments can be constructed to have a variety of cross sections (e.g. circular cross section, etc.) to provide the level with the several advantages set forth previously (e.g. infinite leveling surfaces, etc.).

Specifically illustrated in FIG. 18, is the collapsible level 720 configured so that the segments are physically independent of one another and so that the segments are not connected with a tethering or linking member. In fact, according to this embodiment, the segments of the collapsible level can be disassembled and each segment can function as an independent level, if desired. Likewise, to facilitate the leveling or plumbing of large surfaces, the segments can be assembled to form an extended level. Assembly of the level can be facilitated by fitting one end of each segment with either the male or female insert and the other end of each segment with the other of the male or female insert. In this manner, a collapsible level having any length may be formed by adding an additional segment. According to this embodiment, the individual segments link together magnetically, wherein the male insert is designed and constructed to have either a magnetic north or south pole and the female insert is designed and constructed to have the opposite magnetic pole. The magnetic attraction of the inserts can function to bias the segments towards an assembled state when corresponding ends of different segments are located within a proximal range. Furthermore, the magnetic attraction can facilitate in the assembly of the segments by drawing the segments together, thus permitting the male and female to mate in an un-obstructive manner as previously presented. The attraction may further function to secure an assembled relationship between the segments.

The exemplary embodiment provides the advantage of permitting the level to quickly and easily adapt in response to various leveling needs. For example, a single segment may be used to level small surfaces and can be quickly and easily assembled with additional segments for larger surfaces. The exemplary embodiment provides the further advantage of permitting a damaged section to be replaced with a similar type segment. Thus, damaged segments can be quickly and easily replaced without having to obtain a new level.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given above.

What is claimed and desired to be secured by Letters Patent is:

1. A collapsible rollable level comprising:
   a first rollable segment;
   at least one additional rollable segment, removably attachable to, and rotatable about, said first segment, said at least one additional segment being operable with said first segment to form a rollable level having multiple leveling surfaces and multiple leveling positions; and
   a leveling vial supported in at least one of said first segment and said at least one additional segment.

2. The collapsible level according to claim 1, wherein a rotational alignment of said additional rollable segment with respect to said first rollable segment about a longitudinally central axis is adjustable to at least three rotational orientations.

3. The collapsible level according to claim 1, wherein said first rollable segment is separable from said additional rollable segment.

4. The collapsible level according to claim 1, further comprising a linking member operable with said first rollable segment and said at least one additional rollable segment to permit said at least one additional segment to be assembled with said first segment and to secure an assembled relationship between said segments, as well as to maintain a connection between said segments when disassembled and separated.

5. The collapsible level according to claim 4, wherein said linking member operable with said first rollable segment and said at least one additional rollable segment comprises an elastic member capable of drawing said first segment and said at least one additional segment together without user assistance.

6. The collapsible level according to claim 1, wherein said first rollable segment and said additional segment comprise a circular cross-section and an infinite number of leveling surfaces.

7. The collapsible level according to claim 1, further comprising an accessory device operable with said level to enhance the functionality of said level, said accessory member being removably and slidably attachable to any one of said rollable segments of said level.

8. The collapsible level according to claim 7, wherein said accessory device comprises means for releasably securing and retaining said first rollable segment and said at least one additional rollable segment when said segments are disassembled.

9. The collapsible level according to claim 7, wherein said accessory device is configured to couple at least one rollable segment of like first and second levels along a longitudinally central axis to form an extended level.

10. The collapsible level according to claim 1, further comprising means for removably coupling and coaxially aligning said first rollable segment and said additional rollable segment during assembly of said first segment with said additional segment.

11. The collapsible level according to claim 10, wherein said means for removably coupling and coaxially aligning comprises:
  a male insert; and
  a female insert, said male insert and said female insert operable to removably secure and coaxially align said rollable segments by mating said inserts,
  wherein said male insert is coupled with either of said first rollable segment or said additional rollable segment and said female insert is coupled with the other of said first segment or said additional segment.

12. The collapsible level according to claim 11, wherein said male insert and said female insert comprise at least one tapered region that facilitates said mating of said inserts and said coaxial alignment of said rollable segments.

13. The collapsible level according to claim 10, wherein said means for removably coupling and coaxially aligning comprises a universal insert having both male and female portions formed therein, and wherein a male portion of a first universal insert supported within a first rollable segment is configured to be received within a corresponding female portion of a second universal insert supported within a second rollable segment, said first and second universal inserts comprising the same configuration.

14. The collapsible level according to claim 10, wherein said means for removably coupling and coaxially aligning comprises:
  an insert fittable within one of said first rollable segment and said additional rollable segment; and
  a series of nubs formed in the other of said first segment and said additional segment, said nubs being configured to engage said insert to form an interference fit and lock said segments.

15. The collapsible level according to claim 1, wherein at least one of said first rollable segment and said additional rollable segment comprises extension means for longitudinally extending said segment of said level.

16. The collapsible level according to claim 1, further comprising an end insert configured to support said leveling vial and secure said linking member.

17. A method for operating a collapsible rollable level, said method comprising:
  obtaining a first rollable segment;
  obtaining at least one additional rollable segment, physically independent of, and removably attachable to, said first segment, said at least one additional segment being operable with said first segment, and wherein at least one of said first segment and said additional segment contains a leveling vial; and
  coupling said first segment and said at least one additional segment to together provide multiple leveling surfaces.

18. The method according to claim 17, further comprising rotating said at least one additional rollable segment with respect to said first rollable segment about a longitudinally central axis to provide a plurality of rotationally-staggered leveling surfaces having visible leveling vials.

19. The method according to claim 17, further comprising releasably attaching an accessory device to said level, wherein said accessory device is slidably positionable along the longitudinal length of said level, and wherein said accessory device enhances the functionality of said level.

20. The method according to claim 17, further comprising linking said first rollable segment and said at least one additional rollable segment to permit said at least one additional segment to be assembled with said first segment and to secure an assembled relationship between said segments, as well as to maintain a connection between said segments when disassembled.

21. The method according to claim 20, further comprising causing said first and said additional rollable segments to be inherently drawn together without user assistance.

22. A level comprising:
  multiple interrelated segments, each being removably attachable and rotatable with respect to an adjacent segment along a longitudinal axis; and
  at least one leveling vile visibly supported within at least one of said multiple segments, said leveling vile being positionable at one of several angular positions relative to an adjacent segment.

* * * * *